United States Patent [19]

Davidson et al.

[11] Patent Number: 5,023,006
[45] Date of Patent: Jun. 11, 1991

[54] THERMAL INSULATION CHEMICAL COMPOSITION AND METHOD OF MANUFACTURE

[75] Inventors: Thomas F. Davidson, Manassas; Guy B. Spear, Orlean; Timothy L. Ludlow, Sterling, all of Va.

[73] Assignee: The United States of America as represented by the Secretary of the Navy, Washington, D.C.

[21] Appl. No.: 621,102

[22] Filed: Nov. 30, 1990

[51] Int. Cl.$^5$ ............................ E04B 1/74; C08K 3/36
[52] U.S. Cl. ...................................... 252/62; 524/514; 524/257; 524/258
[58] Field of Search .................. 252/62; 524/514, 257, 524/258

[56] References Cited

U.S. PATENT DOCUMENTS

| | | | |
|---|---|---|---|
| 4,492,779 | 1/1985 | Junior et al. | 524/514 |
| 4,493,324 | 1/1985 | Chacko et al. | 524/514 |
| 4,659,754 | 4/1987 | Edwards et al. | 524/514 |
| 4,789,697 | 12/1988 | Affenzeller et al. | 523/437 |
| 4,921,889 | 5/1990 | Lausberg et al. | 524/514 |
| 4,985,486 | 1/1991 | Westeppe et al. | 524/514 |

*Primary Examiner*—Prince E. Willis
*Assistant Examiner*—J. Silbermann
*Attorney, Agent, or Firm*—Kenneth L. Warsh; Robert M. Wohlfarth

[57] ABSTRACT

A cost effective, efficient thermal insulation composition that will have long shelf life and withstand severe high temperature and pressure conditions in high temperature solid propellant gas generators can be formed of an ethylene propylene, diene monomer (EPDM)-/neoprene rubber binders containing silica powder filler and aramid fibers. The specific chemical constituents include EPDM elastomer, 2 Chlorobutadiene 1,3 elastomer, Silica hydrate, Polymerized Trimethyl Dihydroquinoline, Alkylated Diphenylamines and Diphenyl-p-Phenylendiamene, 40% a,a' Bis (Tert-Butylperoxy), Diisopropylbenzene, Napthenic Process Oil, Synthetic Polyterpene Resin, Aramid Fiber (0.25 inch), and Zinc Oxide, Technical.

9 Claims, No Drawings

THERMAL INSULATION CHEMICAL COMPOSITION AND METHOD OF MANUFACTURE

FIELD OF THE INVENTION

The present invention relates to thermal insulation compositions and more particularly, but without limitation thereto, to a thermal insulation composition that is particularly useful in solid propellant gas generators that may be used in missiles control systems.

BACKGROUND OF THE INVENTION

Modern guided missiles need high performance solid propellant gas generators for providing high pressure and high temperature gases to the control nozzles of post boost control systems and the like. Prior art thermal insulations have not provided the high performance required for advanced weapon systems that must undergo severe operating requirements having long duration propellant burn requirements at very high pressures and temperatures. The primary requirements for thermal insulation of missile system high temperature solid propellant gas generators include high heat flow resistance; erosion resistance; producibility including bonding, layout, machining, dimensional control, mixing and calendaring; aging stability; system chemical compatibility; and non-toxicisity. In order to minimize toxic health hazards it has been necessary to use suitable non-toxic insulation materials in place of asbestos. Solutions to these and other requirements have been accomplished by the thermal insulation composition of the present invention.

OBJECTS OF THE INVENTION

An object of the present invention is to provide a thermal insulation composition that will have long shelf life and withstand severe high temperature and pressure conditions;

still another object of the present invention is to provide a cost effective, efficient and reliable thermal insulation composition;

a further object of the present invention is to provide a thermal insulation composition that is used in high temperature solid propellant gas generators that meets requirements relating to heat flow, erosion resistance, producibility, aging stability, system chemical compatibility and non-toxicity.

SUMMARY OF THE INVENTION

These and other objects have been demonstrated by the thermal insulation composition of the present invention which generally comprises an ethylene propylene, diene monomer (EPDM)/neoprene rubber binders containing silica powder filler and aramid fibers. The specific chemical constituents include:

BINDER
  EPDM elastomer
  2 Chlorobutadiene 1,3 elastomer
FILLER
  Silica Hydrate
ANTIOXIDANTS
  Polymerized Trimethyl Dihydroquinoline
  Alkylated Diphenylamines and Diphenyl-p-Phenylendiamene
CURING AGENT
  40% a,a'Bis(Tert-Butylperoxy), Diisopropylbenzene
PROCESSING AIDS
  Napthenic Process Oil
  Synthetic Polyterpene Resin
FIBER
  Aramid Fiber (0.25 inch)
ACTIVATOR
  Zinc Oxide, Technical All of the above described requirements have been achieved by the thermal insulation composition of the present invention which will be described in detail with reference to the accompanying tables.

DESCRIPTION OF THE PREFERRED EMBODIMENT

The thermal insulation composition of the present invention generally comprises an ethylene propylene, diene monomer (EPDM)/neoprene rubber binder containing silica powder and aramid fibers. The specific chemical composition is set forth in Table I and the functional description of ingredients is set forth in Table II.

TABLE I (Chemical Composition)

| Function | Ingredient | By Weight Composition in Parts per 100 Parts of Rubber Binder (PHR) | | |
|---|---|---|---|---|
| | | Minimum | Maximum | Nominal |
| Binder | EPDM Elastomer | 79.0 | 81.0 | 80.0 |
| | 2 Chlorobutadiene 1,3 Elastomer | 19.0 | 21.0 | 20.0 |
| Filler | Silica Hydrate | 29.0 | 31.0 | 30.0 |
| Antioxidants | Polymerized Trimethyl Dihydroquinoline | 1.9 | 2.1 | 2.0 |
| | Alkylated Diphenylamines and Diphenyl-P-Phenylendiamene | 0.9 | 1.1 | 1.0 |
| Curing Agent | 40% a,a' Bis (Tert-Butylperoxy) Diisopropylbenzene | 5.5 | 5.7 | 5.6 |
| Processing Aids | Napthenic Process Oil | 4.9 | 5.1 | 5.0 |
| | Synthetic Polyterpene Resin | 4.9 | 5.1 | 5.0 |
| Fiber | Aramid Fiber (.25 inch) | 27.0 | 29.0 | 28.0 |
| Activator | Zinc Oxide, Technical | 4.9 | 5.1 | 5.0 |

TABLE II (Functional Description of Ingredients)

| Ingredient | Description |
| --- | --- |
| EPDM Elastomer | EPDM elastomer; binder also adds chemical bond sites |
| 2 Chlorobutadiene 1,3 Elastomer | Chloroprene elastomer added to improve processing and bonding |
| Silica Hydrate | Mineral filler to improve thermal properties (mixing and packing) |
| Polymerized Trimethyl | Polymerized trimethylquinoline antioxidant prevents aging degradation of the polymer chain |
| Alkylated Diphenylamines and Diphenyl-p-Phenylendiamene | Diphenylamine; antioxidant used in combination with above for high temperature storage conditions |
| 40% a,a' Bis (Tert-Butylperoxy), Diisopropylbenzene (curative) | 40% active peroxide supported on Burgess KE clay; curative for both polymers also provides aging stability as compared to Sulfur, for example. |
| Napthenic Process Oil | Lubricating oil; improve mixing |
| Synthetic Polyterpene Resin | Tackifier added to improve green tack (adhesion between uncured layers) |
| Aramid Fiber (.25 inch) | Aramid fiber reinforcement; improved char retention and thermal properties |
| Zinc Oxide | Activator for curing agent |

The following are the process steps used to prepare the uncured thermal insulation composition of the present invention.

(1) The initial batch includes mixing the binders, antioxidants, processing aids and catalyst. A Banbury mixer is used for approximately 8 to 12 minutes (10 minutes optimum).

(2) The fiber filler is then mixed with the step (1) constituents. A Banbury mixer is used for three sub-mixes each for approximately one minute.

(3) The curative is then mixed with the step (2) constituents. A Banbury mixer is used for approximately one minute to form a slab about 4 inches thick, one foot wide and from one to two feet long.

(4) The mixed slab of step (3) is then calendered to about 0.1 inch thick.

(5) The calendered material of step (4) is then remixed in a Banbury mixer for about one to two minutes to form a mixed slab as defined in step (3).

(6) The mixed slab of step (5) is then calendared to about an 0.1 inch thick sheet having an approximate 4 foot width.

(7) A thin plastic cover sheet is applied to one surface of the step (6) uncured insulation sheet and rolled for subsequent use.

(8) When used; the uncured insulation is cut to proper configuration; the configured insulation is laid up and the plastic sheet is removed. If additional insulation thickness is required another piece of uncured insulation is cut to proper configuration and laid up against the first uncured insulation sheet and the plastic sheet is removed. The first and second sheets are tacky and are pressed together to form contiguous insulation sheets. The process is repeated until the total desired uncured insulation thickness is achieved.

(9) The uncured insulation of step (8) is then cured by subjecting it to elevated temperatures wherein the time and temperature is dependent upon the total thickness of uncured insulation.

This invention has been described in detail with particular reference to a certain preferred embodiment, but it is to be understood that variations and modifications can be effected within the spirit and scope of the invention.

What is claimed is:

1. A thermal insulation composition comprising:
EPDM Elastomer
2 Chlorobutadiene 1,3 Elastomer
Silica Hydrate
Polymerized Trimethyl Dihydroquinoline
Alkylated Diphenylamines and Diphenyl-P-Phenylendiamene
40% a,a'Bis(Tert-Butylperoxy), Diisopropylbenzene
Naphthenic Process Oil
Synthetic Polyterpene Resin
Aramid Fiber
Zinc Oxide, Technical.

2. The composition of claim 1 wherein the EPDM elastomer and the 2 chlorobutadiene 1,3 elastomer comprise a rubber binder having by weight of 80±2 and 20±2 parts by weight per 100 parts of rubber binder, respectively.

3. The composition of claim 2 wherein said silica hydrate comprises 30±1 parts by weight per 100 parts by weight of said binder.

4. The composition of claim 3 wherein said polymerized trimethyl dihydroquinoline comprises 2±0.1 parts by weight per 100 parts of said binder, and said alkylated diphenylamines and said diphenyl-p-phenylendiamene comprises 1±0.1 part weight per 100 parts by weight of said binder.

5. The composition of claim 4 wherein said 40% a,a'Bis(Test-Butylperoxy) diisopropylbenzene comprises 5.6±0.1 parts by weight per 100 parts by weight of said binder.

6. The composition of claim 5 wherein said napthenic process oil nominally comprises 5.0±0.1 parts by weight per 100 parts by weight of said binder, and said synthetic polyterpene resin comprises 5.0±0.1 parts by weight per 100 parts by weight of said binder.

7. The composition of claim 6 wherein said aramid fiber comprises 28.0±1.0 parts by weight per 100 parts by weight of said binder.

8. The composition of claim 7 wherein said aramid fiber is 0.21 to 0.29 inches in length.

9. The composition of claim 8 wherein said zinc oxide, technical comprises 5.0±0.1 parts by weight per 100 parts by weight of said binder.

* * * * *